Feb. 23, 1937.  E. JAHNEL  2,071,405

WINCH WITH GEARED TRANSMISSION

Filed Jan. 17, 1936

INVENTOR
Ernst Jahnel
A. H. Golden
ATTORNEY

Patented Feb. 23, 1937

2,071,405

UNITED STATES PATENT OFFICE 2,071,405

WINCH WITH GEARED TRANSMISSION

Ernst Jahnel, Moosburg, Germany

Application January 17, 1936, Serial No. 59,543
In Germany April 7, 1934

10 Claims. (Cl. 192—19)

This invention relates to a hydraulic braking system for a winch. More particularly, my invention relates to a winch in which a liquid pump is used to control the load lowering movement. One feature of my invention embodies a pump and preferably, a pair of chambers, the pump being adapted to pump fluid from one chamer to the other during operation of the winch, there being valve means which permit a free flow during lifting operation, but which prevent free flow when the winch tends to move in a reverse direction under load. The same means which operate the winch to lift the load are preferably used to control the valve to allow a lowering of the load and in the preferred form of my invention, these means are in the form of a crank which is capable, preferably, of linear as well as rotary movement.

As a further feature of my invention, I provide a mechanical brake which is released prior to the release of the hydraulic brake, and similarly, is applied subsequent to the application of the hydraulic brake.

Figure 1:
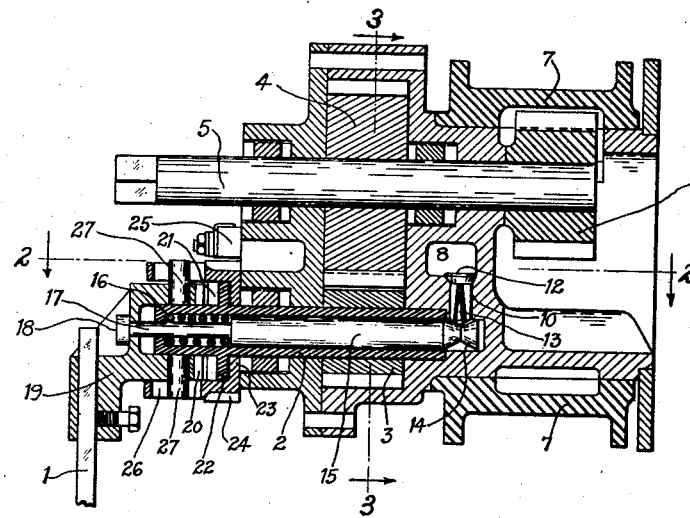
Figure 2:
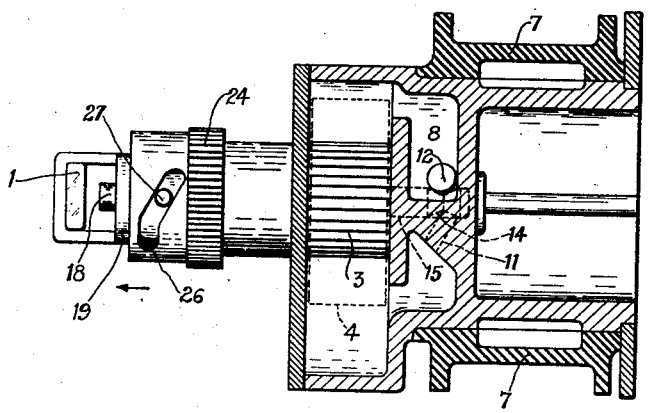
Figure 3:
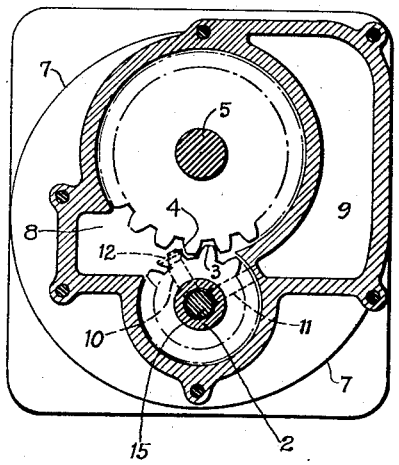
Figure 4:
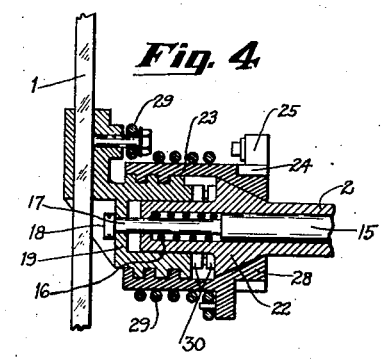

The drawing represents one form of execution of the winch according to the invention of which Fig. 1 shows a longitudinal section of the winch, Fig. 2, a section on line 2—2 of Fig. 1, Fig. 3, a section on line 3—3 of Fig. 1, Fig. 4, another form of execution of the crank gear in longitudinal section.

On a hollow shaft 2 to be driven by the crank handle 1 in the one direction of rotation, a small gear wheel 3 is mounted for engagement with a larger gear wheel 4 on the shaft 5. On the shaft 5 another gear wheel 6 is mounted which is in gear with the winch drum 7. The winch drum 7 is driven by turning the crank handle 1 in the one direction.

The two gear wheels 3 and 4 are made to form a gear wheel pump. The chambers 8 and 9 arranged at both sides of the pair of gear wheels 3 and 4 are connected with one another by channels 10 and 11 placed at angles to each other. In the channel 10 there is a non-return valve 12 arranged with conical stem 13 in such a manner that a delivery of braking liquid from chamber 8 to chamber 9 is possible only when the non-return valve is raised by some mechanical device.

The valve stem 13 on a double cone 14 of a control shaft 15 supported in hollow shaft 2. A spring 16 maintains shaft 15, and consequently valve 12, in the position shown in Fig. 1.

Shaft 15 has a pin extension 17 which traverses the one front end of the hollow shaft 2 and likewise the crank handle 1. A head 18 thereon limits its movement to the right in Fig 1 under the influence of spring 16. The crank handle 1 is provided with a boss 19 surrounding the hollow shaft 2, the boss having on its front side ratchet teeth 20. These teeth are arranged to mesh with teeth 21 of a flange 22 fixed on the hollow shaft 2. A sleeve 23 rotates freely about flange 22 and the boss 19, and is equipped with ratchet teeth 24 engaged by a pawl 25. The sleeve is also provided with a cam slot 26 in which rides pin 27 fixed to the crank boss 19.

The method of action of the device is as follows:

By turning the crank handle 1 counterclockwise as in Fig. 3 and pressing endwise on the crank, the teeth 20 of boss 19 will engage teeth 21 of shaft 2. The shaft 2 will then be rotatable by crank handle 1, and through pin 27 of boss 19, the sleeve 24 will ratchet freely relatively to pawl 25. The two gear wheels 3 and 4 will then convey braking liquid from chamber 8 to chamber 9, which liquid returns without hindrance to the chamber 8, through the channels 11 and 10, lifting the valve disc 12 off its seat. Thus no appreciable resistance is offered by the braking liquid with this motion. When the motion of the crank handle 1 is stopped, the drum 7 stops dead, on the one hand owing to the effect of the mechanical locking 24, 25 and on the other, because a reversed delivery of the braking liquid from chamber 9 to chamber 8 through the gear pump 3, 4, is prevented by the relief-valve 12.

For lowering, the crank handle 1 is turned back clockwise, whereby the crank handle is displaced in the direction of the arrow of Figs. 1 and 2 under the effect of the cam slot 26 and the pin 27, the sleeve 23 being held against rotation by pawl 25 cooperating with teeth 24. This first releases teeth 21 of the shaft 2 from the teeth 20 of the crank boss 19. The head 18 of its pin extension 17 and control shaft 15 is then moved in opposition to the action of spring 16 in such a manner that valve 12 is lifted off its seat by a cam surface of the double cone 14. Therefore the braking liquid has the possibility, on turning the gear wheels 3 and 4 in the reversed direction, to get from chamber 8 into the channels 10 and 11, against a larger or less large resistance according to the position of the valve.

It should be emphasized that the teeth 20 and 21 are thrown out of engagement first, and only thereafter is valve 12 moved to a flow permitting position. Also, by merely varying the amount the crank handle is turned, the valve 12 may be adjusted opposite its seat so that the lowering may be effected with any desired speed. When the lowering action is to be stopped, a short turn of the crank handle counter clockwise returns the valve 12 to its seat first, and only after this has been done, the teeth 20 and 21 are thrown into engagement. No shocks can thus occur here.

Fig. 4 represents another form of the crank handle in which the boss 19 of the crank handle contributes an axial displacement of the shaft 15, and thus controls valve 12. The flange 22 of the hollow shaft 2 is formed conical and engages a corresponding portion of sleeve 23. The boss 19 is in screw threaded relation to sleeve 23, and a torsion spring 29 tends to rotate the two relatively to one another. Because of the screw threaded relation of boss 19 and sleeve 27, they are drawn together to bind the conical surface of sleeve 23 to the conical surface of flange 22 of shaft 2, whereby to rotate shaft 2 and the geared lifting mechanism. Pawl 25 ratchets on teeth 24 and permits lifting rotation while absolutely locking the shaft 2 against lowering rotation.

If crank 1 rotates boss 19 in a reverse direction against the force of spring 29 to extend members 19 and 23, the shaft 2 is released from engagement with sleeve 23 and from the control of pawl 25. Thereafter, only valve 12 controls the lowering of the mechanism. Continued release rotation of crank 1 will then move shaft 15 to the left in Fig. 4 so as to move valve 12 as already described in the first modification.

What I claim is:

1. In a winch with geared transmission, a crank handle for operating said geared transmission, at least one intermediate wheel of the gearing being formed as a gear wheel pump, braking liquid chambers, a channel connecting said chambers, a relief-valve in the said channel connecting the braking liquid chambers, and said relief valve being in connection with the crank handle of the winch for operation thereby.

2. In a lifting winch, fluid chambers and a pump operable incidental to the lowering movement of said winch for pumping fluid from one of said chambers to the other, a valve for preventing the free flow of liquid through said pump whereby to effect the functioning of said pump as a brake, operating means for operating said lifting winch, and control means for said valve operable by said operating means for moving the same into a position permitting a free flow through said pump.

3. A geared lifting mechanism in which a pair of gears act as a gear pump, valve means permitting a free flow of liquid pumped by said gears when said gears are rotated in a lifting direction, said valve means functioning automatically to prevent a return flow of said liquid and thereby braking said lifting mechanism, reversible operating means for said geared lifting mechanism, and means whereby rotation of said operating means in a direction opposite to the lifting direction moves said valve means to permit a return flow.

4. A geared lifting mechanism in which a pair of gears act as a gear pump, valve means permitting a free flow of liquid pumped by said gears when said gears are rotated in a lifting direction, said valve means functioning automatically to prevent a return flow of said liquid and thereby braking said lifting mechanism, reversible operating means for said geared lifting mechanism, means whereby rotation of said operating means in a direction reverse to the lifting direction moves said valve means to permit a return flow, a mechanical brake auxiliary to the hydraulic brake created by said valve, and means whereby said reverse rotation first releases said mechanical brake and then said liquid brake.

5. A geared lifting mechanism in which a pair of gears act as a gear pump, valve means permitting a free flow of liquid pumped by said gears when said gears are rotated in a lifting direction, said valve means functioning automatically to prevent a return flow of said liquid and thereby braking said lifting mechanism, reversible operating means for said geared lifting mechanism, means whereby rotation of said operating means in a direction opposite to the lifting direction moves said valve means to permit a return flow, a mechanical brake actuated by said operating means and auxiliary to the hydraulic brake created by said valve, and means whereby said mechanical brake is applied only after said hydraulic brake is applied.

6. A geared lifting mechanism in which a pair of gears act as a gear pump, valve means permitting a free flow of liquid pumped by said gears when said gears are rotated in a lifting direction, said valve means functioning automatically to prevent a return flow of said liquid and thereby braking said lifting mechanism, a crank rotatable in one direction for operating said geared lifting mechanism, and means whereby rotation of said crank in a reverse direction moves said valve means to permit a return flow and therefore a lowering movement of the lifting mechanism.

7. A geared lifting mechanism in which a pair of gears act as a gear pump, valve means permitting a free flow of liquid pumped by said gears when said gears are rotated in a lifting direction, said valve means functioning automatically to prevent a return flow of said liquid and thereby braking said lifting mechanism, a crank rotatable in one direction for operating said geared lifting mechanism, means whereby rotation of said crank in a reverse direction moves said crank longitudinally, and means for moving said valve to allow return flow actuated by said longitudinal movement.

8. A geared lifting mechanism in which a pair of gears act as a gear pump, valve means permitting a free flow of liquid pumped by said gears when said gears are rotated in a lifting direction, said valve means functioning automatically to prevent a return flow of said liquid and thereby braking said lifting mechanism, a sliding and rotating crank, a clutch engageable by the sliding of said crank in one direction whereby rotation of said crank thereafter in one direction lifts said load, said clutch being disengaged by a reverse sliding of said crank, and means whereby said valve is operated by continued reverse sliding of the crank to permit return flow of said liquid.

9. A geared lifting mechanism in which a pair of gears act as a gear pump, valve means permitting a free flow of liquid pumped by said gears when said gears are rotated in a lifting direction, said valve means functioning automatically to prevent a return flow of said liquid and thereby braking said lifting mechanism, a mechanical holding means for preventing reverse movement of said gears, operating means adapted when rotated in one direction to operate said geared lifting mechanism without hindrance by said mechanical holding means, and means whereby reverse rotation of said operating means first releases said mechanical holding means and then progressively moves said valve to allow return flow and a lowering movement of the geared lifting mechanism.

10. A geared lifting mechanism in which a pair of gears act as a gear pump, valve means permitting a free flow of liquid pumped by said gears when said gears are rotated in a lifting direction, said valve means functioning automatically to prevent a return flow of said liquid and thereby braking said lifting mechanism, an operating member for said geared lifting mechanism, a friction member, means for locking said member against rotation except in a lowering direction, said member being adapted for engagement with said operating member and then to rotate said operating member to actuate said geared lifting mechanism or to hold said operating member against rotation in a lifting direction, an actuating crank, and means whereby when said crank is rotated in one direction it causes engagement of said friction member with said operating member and then actuates said geared lifting mechanism, and whereby when it is rotated in a reverse direction it releases said operating member from said lifting mechanism and then moves said valve to permit return flow.

ERNST JAHNEL.